United States Patent [19]

Leighton et al.

[11] Patent Number: 5,023,368

[45] Date of Patent: Jun. 11, 1991

[54] AMINOPHOSPHONATE-CONTAINING POLYMERS

[75] Inventors: John C. Leighton, Flanders; Carmine P. Iovine, Bridgewater, both of N.J.

[73] Assignee: National Starch and Chemical Investment Holding Corporation, Wilmington, Del.

[21] Appl. No.: 363,244

[22] Filed: Jun. 8, 1989

[51] Int. Cl.$^5$ .................. C07C 69/54; C07C 69/60
[52] U.S. Cl. .................. 560/195; 210/700; 252/180; 252/389.2; 524/599; 560/204
[58] Field of Search ............... 560/195, 222; 252/180, 252/389.2; 210/700

[56] References Cited

U.S. PATENT DOCUMENTS

| | | | |
|---|---|---|---|
| 2,358,222 | 9/1944 | Fink et al. | 210/23 |
| 2,783,200 | 2/1957 | Crum et al. | 210/23 |
| 2,980,610 | 4/1961 | Ruehrwein | 210/58 |
| 3,285,886 | 11/1966 | Gunderson et al. | 210/23 |
| 3,463,730 | 8/1969 | Booth et al. | 210/58 |
| 3,518,204 | 6/1970 | Hansen et al. | 252/181 |
| 3,884,871 | 5/1975 | Herman et al. | 524/650 |
| 3,945,843 | 3/1976 | Holty et al. | 106/308 M |
| 4,004,939 | 1/1977 | O'Brien et al. | 106/135 |
| 4,457,847 | 7/1984 | Lorenc et al. | 210/698 |
| 4,604,212 | 8/1986 | Matz | 210/700 |
| 4,707,306 | 11/1987 | Leighton et al. | 260/501.12 |

FOREIGN PATENT DOCUMENTS 3755785 1/1985 Australia .
0129329 12/1984 European Pat. Off. .

*Primary Examiner*—Michael L. Shippen
*Assistant Examiner*—Vera C. Clarke
*Attorney, Agent, or Firm*—Edwin M. Szala

[57] ABSTRACT

Aminophosphonate-containing polymers of the formula:

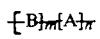

wherein
A represents repeating units from one or more ethylenically unsaturated comonomers;
B is

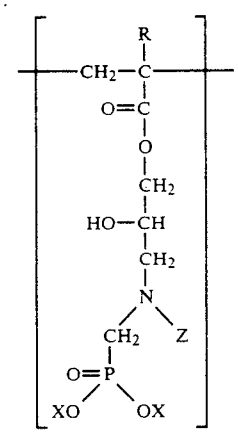

wherein
R is hydrogen or methyl,
X is hydrogen or an alkali metal,
Z is $CH_2-P(O)(OX)_2$ or $C_1-C_6$ alkyl, aryl, cyclohexyl or alkaryl, m/n is 0.01 to 0.5.

The novel polymers of the present invention may be used as dispersants for concentrated aqueous particulate slurries, and as corrosion inhibitors and scale inhibitors in water treatment.

7 Claims, No Drawings

AMINOPHOSPHONATE-CONTAINING POLYMERS

BACKGROUND OF THE INVENTION

This invention relates to novel aminophosphonate-containing polymers, and their use as dispersants for concentrated aqueous particulate slurries, especially for titanium dioxide and kaolin, and as corrosion and scale inhibitors.

The preparation of similar polymers is disclosed in U.S. Pat. No. 4,707,306 to Leighton, et al., which describes the synthesis of alpha-aminomethylene phosphonate betaines and polymers prepared therewith.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already in the solution.

As these reaction products precipitate on surfaces of the water carrying system, they form scale or deposits. This accumulation prevents effective heat transfer, interferes with fluid flow, facilitates corrosive processes, and harbors bacteria. This scale formation is an expensive problem in many industrial water systems causing delays and shutdowns for cleaning and removal.

Scale-forming compounds can be prevented from precipitating by inactivating their cations with chelating or sequestering agents, so that the solubility of their reaction products is not exceeded. Generally, this requires large quantities of chelating or sequestering agents as cations, since chelation is a stoichiometric reaction, and these amounts are not always desirable or economical.

When a precipitation inhibitor is present in a potentially scale-forming system at a markedly lower concentration than that required for (stoichiometric) binding of the scale-forming cation, it is said to be present in "threshold" amounts, Hatch and Rice, "Industrial Engineering Chemistry", Vol. 31, pages 51 to 53 (January 1939); Reitemeier and Buehrer, "Journal of Physical Chemistry", Vol. 44, No. 5, pages 535 to 536 (May 1940); Fink and Richardson, U.S. Pat. No. 2,358,222; and Hatch, U.S. Pat. No. 2,539,305.

Certain water soluble polymers, including groups derived from acrylamide and acrylic acid have been used to condition water containing scale-forming compounds, as disclosed in U.S. Pat. Nos. 2,783,200; 3,514,476; 2,980,610; 3,285,886; 3,463,730; 3,518,204; and 4,604,212.

The problems associated with mineral scaling in cooling water systems have been known for many years. In such systems water flowing around heat exchange equipment deposits mineral scale on the surface of the installation. This scale builds up in layers giving an insulation effect, reducing the heat transfer of the apparatus and also resulting in poor water circulation. Eventually this necessitates the shut-down of the unit to allow mechanical or chemical cleaning.

Depositions in lines, heat exchange equipment, etc., may originate from several causes. For example, the precipitation of calcium carbonate and calcium phosphate will form scale, but products of corrosion also result in a deposit of iron oxide salts. These are deposited as scales due to changes in temperature, pH, concentration, pressure and incompatible water additives.

The development of high pH and/or non-chromate corrosion programs has increased the potential for scale formation due to chemical precipitation. In particular, since most of the treatments currently used include inorganic phosphate and/or low molecular weight, non polymeric phosphonic acid compounds, the reversion of the polyphosphates and the organic phosphates plus the use of high alkaline operating conditions leads to the formation and deposition of highly insoluble calcium phosphate.

Although steam generating systems are different from cooling water systems, they share common problems relating to calcium phosphate and iron oxide formation and other mineral scale deposition. In this regard, the formation of scale and sludge deposits on boiler heating surfaces is the most serious water problem encountered in steam generation. Although current industrial steam producing systems make use of external treatments of the boiler feed water to reduce scale forming ions, those operations are not totally effective and do not provide adequate treatment since muds, sludge, silts and hardness-imparting ions are not treated thereby, and eventually are introduced into the steam generating system.

Accordingly, internal treatment, i.e., the use of solubilizing chemicals which have the ability to keep the scale-forming materials in solution at concentrations substantially higher than would be expected are used throughout the industry in an attempt to alleviate the problems encountered by scale deposition. Solubilizing chemicals include alginates, lignins, lignosulfonates, tannins, carboxymethyl cellulose materials, and synthetic polymers such as polyacrylates and polymethacrylates.

Particulate matter, including, clays and pigments are employed in a variety of systems as fillers in plastics, rubbers, paper, fertilizers, herbicides, pesticides and animal feed; and as pigments in paints, rubbers, and paper coatings. For many applications, the particulate matter is shipped, stored, and/or applied in concentrated aqueous slurry form. Typically, the slurries have concentrations ranging from about 50-80% solids by weight. It is therefore a necessity that the slurry viscosity be as low as possible in order to afford ease of handling during pumping, admixing and application operations. A useful dispersant should be capable of providing stable low slurry viscosities, preferably over a wide usage range (e.g. minor fluctuations in dispersant concentration will not greatly affect slurry viscosity).

The prior art is replete with polymeric dispersants. U.S. Pat. No. 4,457,847 (issued July 3, 1984 to W. Lorenc, et al.) discloses a method of treating boiler water hardness with a water-soluble anionic vinyl polymer sequestrant containing at least 30% by weight carboxylate functionality. The Japanese Article "The Dispersion Applications of Copolymers from Sodium Vinyl Sulfonate", Sakaguchi and Nagase, Kogyo Kagaku Zasshi, Vol. 69 (1966) discloses the utility of low molecular weight sodium vinyl sulfonate-sodium acrylate copolymers as dispersants for low solids (e.g., 10%) kaolin clay and calcium carbonate aqueous slurries.

Australian Pat. application No. 37447/85 (published July 18, 1985) discloses various sodium hypophosphite modified acrylic acid copolymers. The cotelomers are described in general to be useful as boiler scale inhibitors, corrosion inhibitors in surface coating compositions for metal substrates, and as dispersants for china clay slurries.

Dispersants that are particularly useful for high solids pigment slurries have included inorganic polyphosphates such as sodium hexametaphosphate, sodium tripolyphosphate and potassium tripolyphosphate, and organic dispersing agents such as the sodium salt of polycarboxylic acid. U.S. Pat. No. 3,884,871 (issued May 20, 1975 to D. Herman). While the above polyphosphates are highly effective initially during the preparation of high solids slurries, upon aging or exposure to slightly elevated temperatures, they revert to orthophosphates which are ineffective as dispersants, thus resulting in high slurry viscosities.

U.S. Pat. No. 3,945,843 (issued Mar. 23, 1976 to D. Helty, et al.) describes the use of methyl acrylate-acrylic acid copolymers as dispersants for high solids suspensions of paper coating pigments such as calcium carbonate. The use of bisulfite-terminated oligomers as dispersants for high solids slurries of titanium dioxide and other particulate matter is described in U.S. Pat. No. 4,004,939 (issued Jan. 4, 1979 to R. DeColibus). Low molecular weight polyacrylic acid homopolymers and copolymers containing sulfonic acid groups which have polydispersities below 1.5 are described as useful pigment dispersants in European Patent Publication 129,329 (published Dec. 27, 1984).

Accordingly, an object of the present invention is to provide novel aminophosphonate-containing polymers. Another object of the invention is to provide a process of preparing said polymers. Still another object of the invention is to provide aminophosphonate polymers that are water soluble and water dispersible.

An additional object of the present invention is to provide a method of dispersing high solids particulate suspensions with the present novel polymer. Another object is to provide high particulate slurries which are low in viscosity and which have good stability after aging.

Still another object of the present invention is to provide a process for inhibiting corrosion and the formation and deposition of scale in aqueous systems with the present novel amino phosphonate-containing polymers.

SUMMARY OF THE INVENTION

The above and related objects are achieved by providing novel aminophosphonate-containing polymers of the following structure:

$$\text{---}( B )_m\text{---}( A )_n\text{---} \quad (I)$$

wherein

A represents repeating units derived form one or more ethylenically unsaturated comonomers, and B is $$\left[ \begin{array}{c} \text{---CH}_2\text{---C(R)---} \\ | \\ \text{O=C} \\ | \\ \text{O} \\ | \\ \text{CH}_2 \\ | \\ \text{HO---CH} \\ | \\ \text{CH}_2 \\ | \\ \text{N(CH}_2\text{P(O)(OX)}_2\text{)(Z)} \end{array} \right] \quad (II)$$

wherein

R is hydrogen or methyl,

X is hydrogen or an alkali metal,

Z is $CH_2-P(O)(OX)_2$ or $C_1-C_6$ alkyl, aryl, cyclohexyl or alkaryl; and n and m are positive integers, m/n = 0.01 to 0.50, and preferably m/n is 0.01 to 0.25.

The novel aminophosphonate-containing polymers contemplated herein are preferably water soluble and water dispersible.

The aminophosphonate-containing polymers are prepared by the following steps:

(1) Polymerizing a monomer of acrylic acid or methacrylic acid to form a homopolymer or, if other ethylenically unsaturated comonomers are used, a copolymer. The resultant polymers can be represented by the general structure:

$$\text{---}( C )_m\text{---}( A )_n\text{---} \quad (III)$$

wherein

A is as defined above,

C is acrylic or methacrylic acid, m/n = 0.01 to 0.5.

(2) Reacting said polymer with a phosphonate halohydrin reagent of the following structure:

$$L-CH_2-CH(OH)-CH_2-N(CH_2-P(O)(OX)_2)(Z) \quad (IV)$$

or with an epoxide reagent of the following structure:

$$\underset{O}{\overset{\triangle}{CH_2}}-CH_2-N(CH_2-P(O)(OX)_2)(Z) \quad (V)$$

wherein

L is a halogen,

X and Z are as defined above.

DETAILED DESCRIPTION

The polymers prepared herein are phosphonated derivatives of polymers bearing at least one carboxylic acid functionality prepared by polymerizing an ethylenically unsaturated comonomer with acrylic or methacrylic acid and reacting said polymer with an aminophosphonate halohydrin reagent.

The polymer(s) that are reacted with the phosphate halodyrin are in general water dispersible homo- and copolymers of acrylic acid and methacrylic acid.

Representative ethylenically unsaturated comonomers include acrylic or methacrylic acids and esters thereof with $C_1$-$C_{18}$ alcohols; unsaturated dicarboxylic acids such as itaconic and maleic acids and esters thereof, (meth)acrylamide and their N-substituted derivatives, such as N-mono and N-dimethyl, -ethyl, -propyl, and -butyl acrylamide or methacrylamide and N-mono or diphenylacrylamide; vinyl esters such as vinyl acetate or vinyl propionate; vinyl ethers such as butyl vinyl ether; N-vinyl lactams such as N-vinyl pyrrolidinone; olefins such as styrene and ethylene; alkyl vinyl ketones such as methyl or ethyl vinyl ketone; diesters such as dimethyl, diethyl, dipropyl, dibutyl, diphenyl, dibenzyl, and di(phenylethyl) itaconate, maleate, and fumarate; and polyethyleneglycol acrylate or methacrylate or polypropyleneglycol acrylate or methacrylate.

Also useful herein are minor amounts (e.g., 0.01 to about 2%) of multifunctional crosslinking monomers. Representative of suitable crosslinkers are those containing a multiplicity of ethylenically unsaturated units per molecule such as diallyl maleate, triallyl cyanurate, tetraethylene glycol dimethyacrylate, hexa-allyl sucrose, etc.

The alkali metals useful in the present invention are selected from the group consisting of sodium, lithium and potassium. The halogens useful in the present invention are selected from the group consisting of chlorine, bromine, iodine and fluorine.

The preferred method for the production of the aminophosphonate-containing polymer involves two steps: (1) the polymerization of the acrylic or methacrylic acid with one or more ethylenically unsaturated comonomers, and (2) reacting said acrylic polymer with an aminophosphonate halohydrin (phosphonomethylamine) reagent. More specifically, these polymers are prepared by first polymerizing a monomer of acrylic or methacrylic acid represented by

to form a homopolymer or, if other ethylenically unsaturated comonomers are used, a copolymer.

The resultant polymers can be represented by the general structure:

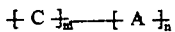

wherein C is as previously defined, n and m are positive integers, m/n is 0.01 to 0.5 and preferably m/n is 0.01 to 0.25 and A is a repeating unit derived from one or more ethylenically unsaturated comonomers.

When A is water insoluble, then m/n must be large enough to permit the polymer to remain water soluble. If A has a carboxylic functionality such as in itaconic or maleic acid, then the carboxylic acid functionality of A can be derivatized as well as the carboxylic functionality of C.

These polymers are then reacted with a compound of the general structure:

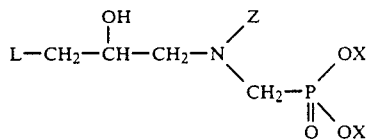

or with an epoxide reagent of the following general structure:

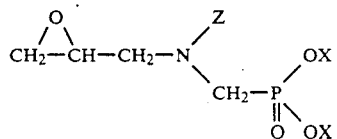

Structure V is the epoxide intermediate of general structure IV, which can also be reacted with a carboxylic acid polymer to form the aminophosphonate-containing polymers represented by the general structure

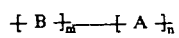

wherein
B is

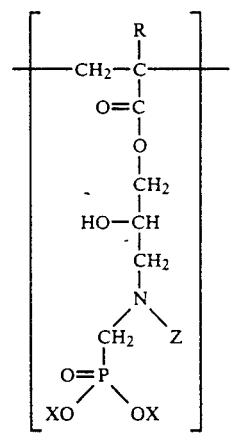

m and n are positive integers, m/n is 0.01 to 0.5 and preferably m/n is 0.01 to 0.25, and R, X, Z, and A, are as previously defined.

The molecular weight of the aminophosphonate-containing polymers can be almost any weight depending on a number of factors, including the method of prepolymer preparation and the degree of cross-linking, if any. The molecular weight of the polymers is preferably in the range of 1,000 to 1,500,000 and most preferably 2,000 to 50,000.

An alternative method for the production of the aminophosphonate-containing polymers involves first isolating the aminophosphate-containing monomer and then polymerizing the monomer with one or more ethylenicaly unsaturated comonomers.

The aminophosphonate-containing monomer could be isolated by evaporation of the reaction solvent to form a syrup. The syrup could than be lyopholized to form the dry monomer.

The reaction of these compounds is carried out in a suitable aqueous solvent (usually water of alcohol/water) at a pH of 7-9, preferably a slightly basic pH of 7.5-8.2, and at a temperature of about 10-90° C., preferably at a slightly elevated temperature of 60°-80° C. Under such conditions the reaction is substantially complete in 0.5 to 10 hours, preferably 1 to 5 hours. The product can be reclaimed by recrystalization or other separation means. The solution may be acidified with mineral acid or by ion exchange if the acid form of the polymer (where X is hydrogen) is desired.

In order to produce compounds of Formula I, where R is hydrogen and Z is $-CH_2PO_3X_2$, chlorohydroxypropyl (or butyl) bisphosphonomethylamine is used as the compound of Formula IV and the derivatization of an acrylic acid homo- or copolymer is carried out at a pH of about 7 to 9, preferably about pH 8, using the same temperature and conditions described above.

The polymers to be derivatized can be prepared by any known polymerization process such as solution polymerization, precipitation or emulsion polymerization. The polymers can be prepared by free radical initiation, addition polymerization and condensation polymerization such as in carboxy urethanes.

It is well known that polymerization can be initiated by a free radical initiator such as peracid salt, e.g., hydrogen peroxide, sodium peroxide, lithium peroxide, peracetic acid, persulfuric acid or the ammonium and alkali metal salts thereof, and more specifically, ammonium persulfate, sodium peracetate, lithium persulfate, potassium persulfate, sodium persulfate, t-butyl peracetate, etc. Various azo compounds may also be used, such as azobisisobutyronitrile.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, (such as sodium metabisulfite).

If emulsion polymerization procedures are employed, the emulsifying agent is generally employed oil-in-water surface active agents or mixtures thereof generally employed in emulsion polymerization procedures. When combinations of emulsifying agents are used, it is advantageous to use a relatively hydrophobic emulsifying agent in combination with a relatively hydrophilic agent. The emulsifier used in the polymerization can also be added in its entirety to the initial charge, or a portion of the emulsifier can be added continuously or intermittently during polymerization.

If an interpolymerization procedure such as a modified batch process is used, the major amount of some or all the comonomers and emulsifier are charged to the reaction vessel after polymerization has been initiated. In this manner, control over the polymerization of monomers having widely varied degrees of reactivity can be achieved. It would be preferable to add a small portion of the monomer emulsion initially and then the remainder of the monomer emulsion intermittently or continuously over the polymerization period.

The aminophosphonate-containing polymers are potentially useful in a variety of applications including soil anti-redeposition agents, detergents, chelating agents, crystal modifiers, oil drilling, paint dispersions, coatings and cosmetics such as in conditioners, hair sprays, mousse products.

The present novel polymers can be used for water treatment applications, such as in scale inhibition. The word "scale" includes any scale forming in an aqueous solution. Examples include calcium carbonate, calcium sulfate, calcium phosphate, calcium phosphonate (including calcium hydroxyethylidene diphosphonic acid), calcium oxalate, barium sulfate, silica, alluvial deposits, metal oxide (including iron oxide) and metal hydroxide (including magnesium hydroxide). The novel polymers used as scale inhibitors include polymers having a number average molecular weight from 1,000 to 50,000.

The present novel polymers can also be employed as dispersing agents in amounts ranging from 0.05 to 3.0% by weight on the weight of the pigment. The resultant pigment dispersion is exceptionally stable and possesses a low viscosity. These polymers can also be used to produce high solid aqueous slurries of about 50 to 75% solids which are low in viscosity and have good stability upon aging.

The present novel polymers are particularly useful as dispersants for high solids titanium dioxide pigment slurries which include pure titanium dioxide as well as hydrous oxide treated titanium dioxide pigments. The number average molecular weights of said polymers are about 1,000 to 50,000 and preferably 2,000 to 10,000. High solids pigment slurries employing the novel polymers used herein as dispersants exhibit improved low viscosities which are stable after aging. The polymers are shown in the examples to give useful slurry viscosities over a wide range of treatment levels. This is evidences by observing the average viscosity of aged slurries containing a range of dispersant concentrations and the degree to which the slurry viscosities fluctuate from the average viscosity over the treatment range.

The quantity of the polymer employed in an aqueous titanium dioxide slurry will vary with circumstances depending on such factors as the processing conditions used to produce the titanium dioxide to be slurried, the particle size thereof, as well as the solids content of the slurry. Ordinarily, improved viscosity control will be realized when the polymer is employed in amounts ranging form about 0.01 to 1.0%, preferably 0.05% to 0.5%, based on the weight of the pigment. The exact amount to be added can be determined by simple routine tests known to those skilled in the art.

The present novel polymer may be useful when employed in a dispersant blend with an inorganic polyphosphate, for high solids slurries of such clays as attapulgite and sepiolite. It is possible that by employing a synergistic blend of the polymer and a polyphosphate, aqueous slurries of attapulgite may be prepared which have lower and more stable viscosities than slurries employing either component of the dispersant blend alone. Useful inorganic polyphosphate dispersants include the soluble salts of tripolyphosphates, pyrophosphates, (e.g., tetrasodium pyrophosphate), polymetaphosphates (e.g., sodium hexametaphosphate) and other conventionally used polyphosphates. Tetrasodiumpyrophosphate (TSPP) is preferably employed in the blend.

Polymers of the present invention useful as dispersants may be prepared by a two step procedure involving:

1) polymerization of acrylic acid in aqueous medium with (optionally) sodium hypophosphite as a telogen;

2) derivatization of the resulting polymer/telomer with amino phosphonate reagents IV or V according to procedures outlined above.

The following dispersance test procedure was employed in order to evaluate the present novel polymers as dispersants. Initial slurry viscosities were measured and the results are set forth in Tables 4, 5 and 6; however, the initial readings should be understood to be merely an indication of the usefulness of the dispersants tested. The viscosity readings after aging are more representative of the true dispersant properties of each polymer evaluated.

DISPERSANCY TEST PROCEDURE FOR TITANIUM DIOXIDE SLURRIES AND KAOLIN CLAY SLURRIES

Into a 300 ml. stainless steel cup is added 0.7-5.6 ml. of an aqueous 14% dispersant solution, 2.1 ml. of 10.5% aqueous sodium hydroxide and distilled water to bring the solution to 60 mls. To the solution is added 140 grams of titanium dioxide (Tipure 901 obtained from DuPont) with slow mixing to form a slurry. The 70% particulate solids slurry is mixed for 2 minutes at 3000±100 rpm on a dispersator obtained from Premier Mill Corp. of Temple, Pa. The slurry is thereafter poured into a 100 ml. glass jar and the viscosity is measured employing a Brookfield RVF Viscometer with Spindle #3 at 50 rpm. The jars are covered and the slurries are statically aged for a total of 96 hours in a forced draft oven at 120° F. (49° C.) After 48 and 96 hours aging, the samples are shaken vigorously twice (Kaolin clays samples were shaken 6-7 times) before a viscosity measurement is taken, the viscometer being run in the slurry for 3 minutes prior to taking the reading.

EXAMPLE 1

This example describes the synthesis of chlorohydroxypropyl bisphosphonomethylamine (CHPBMA) from bisphosphonomethyl allyl amine, elemental chlorine, and water, for reaction with a polymer containing a carboxylic acid functionality to produce the novel polymers of the present invention.

A 1.0 liter four-necked flask was equipped with a mechanical stirrer, condenser, thermometer, gas dispersion tube and an ice water bath. Bisphosphonomethyl allyl amine (180.0 grams, prepared by the method of K. Moedritzer and R. R. Irani, J. Org. Chem 31 1603 (1966), and 300 ml. of water were charged to the flask and partial dissolution occurred. Chlorine gas (90.0 g.) was bubbled sub-surface into the reaction mixture through the gas dispersion tube for a period of 4 hours. The temperature during the chlorine addition was controlled at 30° C. Once the chlorine addition was complete, the reaction mixture was maintained at 30 ° C. for one hour. Water and excess chlorine (total volume 100 ml.) were removed under vacuum (50° C./5 mm Hg). The resulting solution of CHPBMA weighed 533.1 g., and contained 2.29 meq. of ionic chloride per gram, and had a total chloride concentration of 3.73 meq. per gram. The solution may be used directly or chilled in order to crystallize the precipitate the product.

EXAMPLE 1a

This example described the synthesis of chlrohydroxypropyl benzyl phosphonomethylamine (CHPBZPMA) from benzyl phosphonomethyl allyl amine, chlorine, and water, for reaction with a polymer containing a carboxylic acid functionality to produce the novel polymers of the present invention.

A 1.0 liter four-necked flask is equipped with a mechanical stirrer, condenser, thermometer, gas dispersion tube and an ice water bath. Benzyl phosphonomethyl allyl amine (177.0 g, prepared by the method of K. Moedritzer and R. R. Irani, J. Org. Chem 31 1603 (1966), and 300 ml. of water is charged to the flask. Chlorine gas (90.0 g.) is bubbled sub-surface into the reaction mixture through the gas dispersion tube for a period of 4 hours. The temperature during the chlorine addition is controlled at 30° C. Once the chlorine addition is complete, the reaction mixture is maintained at 30° C. for one hour. Water and excess chlorine (total volume 100 ml.) is removed under vacuum (50° C./5 mm Hg). The resulting solution is analyzed for chlorine (organic and ionic) content. The solution may be used directly or chilled in order to crystallize and precipitate the product.

EXAMPLE 1b

This example describes the synthesis of chlorohydroxypropyl cyclohexyl phosphosphonomethylamine (CHPCPMA) from cyclohexyl phosphonomethyl allyl amine, chlorine, and water, for reaction with a polymer containing a carboxylic acid functionality to produce the novel polymers of the present invention.

A 1.0 liter four-necked flask is equipped with a mechanical stirrer, condenser, thermometer, gas dispersion tube and an ice water bath. Cyclohexyl phosphonomethyl allyl amine (171.1 g, prepared by the method of K. Moedritzer and R. R. Irani, J. Org. Chem 31 1603 (1966), and 300 ml. of water are charged to the flask. Chlorine gas (90.0 g.) is bubbled sub-surface into the reaction mixture through the gas dispersion tube for a period of 4 hours. The temperature during the chlorine addition is controlled at 30° C. Once the chlorine addition is complete, the reaction mixture is maintained at 30° C. for 1 hour. Water and excess chlorine (total volume 100 ml.) are removed under vacuum (50° C./5 mm Hg). The resulting solution of CHPCPMA is analyzed for chlorine (organic and ionic) content. The solution may be used directly or chilled in order to crystallize and precipitate the product.

EXAMPLE 2

This example illustrates the preparation of polyacrylic acid for reaction with CHPBMA to produce the novel polymers of the present invention.

A two liter four-necked flask was equipped with a mechanical stirrer, thermometer, condenser, subsurface nitrogen purge, a means for heating the flask and two addition funnels (500 ml. and 125 ml.). The flask was charged with 300 ml. of water and 109.0 g. of sodium hypophosphite monohydrate. With a slow nitrogen purge, the contents were heated to an maintained at 77-80° C. Thereafter, acrylic acid (288 g.) and a solution of 7.5 g. of sodium persulfate in 70 ml. of water were added simultaneously over a period of 2.0 and 2.5 hours, respectively. The mixture was held at 85° C. for an additional two hours and then cooled to room temperature.

The mixture had the properties listed in Table 2 below. Using the above procedure, other solution polymers 2B and 2E exemplified herein were prepared as shown in Table 2 below.

TABLE 2

| Material | 2A | 2B | 2C | 2D | 2E |
|---|---|---|---|---|---|
| distilled $H_2O$ | 300 | 300 | 300 | 300 | 300 |
| $NaH_2PO_2 \cdot H_2O$ | 10.0 | 17.3 | 20.5 | 25.4 | 38.4 |
| acrylic acid | 288 | 288 | 288 | 288 | 288 |
| $Na_2S_2O_8$ | 7.5 | 7.5 | 7.5 | 7.5 | 7.5 |
| distilled $H_2O$ | 70 | 70 | 70 | 70 | 70 |
| Analysis | | | | | |
| % solids | 46.6 | 45.7 | 46.1 | 44.8 | 48.4 |
| ppm residual acrylic acid | 100 | 100 | 100 | 100 | 100 |
| Mw ($\times 10^4$) | 2.49 | 1.00 | 0.897 | 0.837 | 0.613 |
| Mn ($\times 10^3$) | 6.13 | 4.00 | 3.55 | 2.36 | 2.18 |
| D | 4.06 | 2.5 | 2.53 | 3.55 | 2.81 |

TABLE 3

| | A | B | C | D | E | F | G | H | I | J |
|---|---|---|---|---|---|---|---|---|---|---|
| Material | | | | | | | | | | |
| Polymer 2A (46.6%) | 244.6 | 244.6 | — | — | — | — | — | — | — | — |
| 2B (45.7%) | — | — | 120.6 | — | — | — | — | — | — | — |
| 2C (46.1%) | — | — | — | 119.9 | — | — | — | — | — | — |
| 2D (44.8%) | — | — | — | — | 265.3 | 265.3 | 123.6 | — | — | — |
| 2E (48.4%) | — | — | — | — | — | — | — | 253.0 | 253.0 | 112.9 |
| NaOH (50% w/w) | 112 | 112 | 53. | 50. | 112 | 112 | 52. | 112 | 112 | 51. |
| NaOH (25% w/v) | 18 ml | 11 ml | 4 ml | 4 ml | 16 ml | 24 ml | 3 ml | 11 ml | 10 ml | 4 ml |
| CHPBPMA (47.4%) | 94.3 | 188.6 | 20.0 | 20.0 | 94.3 | 188.6 | 20.0 | 94.3 | 188.6 | 20.0 |
| NaOH (25% w/v) | 105 ml | 210 ml | 22 ml | 22 ml | 101 ml | 203 ml | 22 ml | 107 ml | 230 ml | 22 ml |
| | 3A | 3B | 3C | 3D | 3E | 3F | 3G | 3H | 3I | 3J |
| Analysis | | | | | | | | | | |
| % solids | 36.9 | 33.9 | 30.0 | 30.3 | 35.4 | 35.2 | 29.2 | 35.8 | 40.4 | 30.0 |
| Brookfield cps | 144. | 74. | 35 | 30. | 48. | 33. | 30 | 29. | 27. | 25. |
| pH | 7.1 | 7.0 | 7.0 | 7.0 | 7.0 | 7.0 | 7.1 | 7.0 | 7.0 | 7.1 |
| % P (observed) dry basis | 2.92 | 5.29 | 3.86 | 3.25 | 4.36 | 5.22 | 5.17 | 4.00 | 5.95 | 3.41 |
| % P (theory) dry basis | 5.38 | 8.23 | 3.60 | 3.81 | 6.34 | 8.91 | 4.07 | 6.67 | 9.18 | 4.78 |
| meq Cl/g (observed) | 0.597 | 0.928 | — | — | 0.568 | 0.775 | — | 0.537 | 0.850 | — |
| meq Cl/g (theory) | 0.625 | 0.907 | — | — | 0.597 | 0.810 | — | 0.592 | 0.879 | — |

EXAMPLE 3

This example illustrates the reaction of polyacrylic acid with CHPBMA to produce the novel polymers of the present invention.

An apparatus equipped as in Example 2 was charged with 244.6 g. of polymer 2A (46.6%). About 112 g. of 50% (w/w) NaOH solution was added over half hour to partialy neutralize the polymer. The pH of the contents was then adusted to pH 7.7±0.2 with 18 ml. of 25% (w/v) NaOH. The temperature of the reaction mixture was raised to 65° C. About 94.3 ml. of the CHPBPMA polymer solution (47.4%) was added over one hour during which the pH of the reaction mixture was monitored and maintained at 7.7+/−0.2 by the intermittent addition of 105 ml. of 25% (w/v) NaOH. When the additions were complete, the reaction mixture was maintained at a pH of 7.7±0.2 at 65° C. for one hour. The reaction mixture is then adjusted to a pH of 7.0 with diluted hydrochloric acid.

The reaction mixture contained the properties listed in Table 3. Using the above procedure, other solution polymers 3B to 3J exemplified herein were prepared as shown in Table 3 below.

EXAMPLE 4

This example illustrates the ability of the present novel polymers to effectively disperse a 70% solids slurry of titanium dioxide.

Polymers 3 C, D, G and J were examined as a dispersant for a high solids titanium dioxide slurry. A 70% slurry of Tipure 901 titanium dioxide was treated with the polymers at levels ranging from 0.05–0.4% polymer relative to titanium dioxide. The Brookfield viscosity of the slurries was checked initially, and after 48 and 96 hour aging periods. Table 4 below summarizes the results of the testing.

TABLE 4

| Sample | 0.05% | 0.1% | 0.2% | 0.3% | 0.4% |
|---|---|---|---|---|---|
| 3C | | | | | |
| initial viscosity, cps. | 182 | 196 | 124 | 112 | 158 |
| 48 hr. age viscosity, cps. | 208 | 260 | 244 | 242 | 108 |
| 96 hr. age viscosity, cps. | 228 | 174 | 190 | 212 | 110 |
| 3D | | | | | |
| initial viscosity, cps. | 178 | 132 | 110 | 104 | 130 |
| 48 hr. age viscosity, cps. | 192 | 130 | 156 | 136 | 86 |
| 96 hr. age viscosity, cps. | 236 | 158 | 130 | 134 | 82 |
| 3G | | | | | |
| initial viscosity, cps. | 130 | 112 | 110 | 126 | 150 |
| 48 hr. age viscosity, cps. | 142 | 108 | 106 | 100 | 92 |

TABLE 4-continued

| Sample | 0.05% | 0.1% | 0.2% | 0.3% | 0.4% |
|---|---|---|---|---|---|
| 96 hr. age viscosity, cps. | 190 | 126 | 100 | 98 | 70 |
| 3J | | | | | |
| initial viscosity, cps. | 126 | 124 | 106 | 114 | 168 |
| 48 hr. age viscosity, cps. | 148 | 110 | 100 | 100 | 104 |
| 96 hr. age viscosity, cps. | 188 | 122 | 98 | 96 | 68 |

EXAMPLE 5

Polymers 3G and 3J were examined as dispersants for a high solid kaolin clay slurry. A 70% slurry of kaolin ASP 600 was treated with the polymers at levels ranging from 0.05–0.4% polymer relative to the kaolin. The Brookfield viscosity of the slurries was checked initially and after 48 and 96 hour aging periods. Table 5 below summarizes the results of this testing.

TABLE 5

| Sample | 0.05% | 0.1% | 0.2% | 0.3% |
|---|---|---|---|---|
| Polymer 3G | | | | |
| initial viscosity, cps. | 714 | 318 | 450 | 760 |
| 48 hr. age viscosity, cps. | 1132 | 540 | 460 | 670 |
| 96 hr. age viscosity, cps. | 1678 | 670 | 538 | 750 |
| Polymer 3J | | | | |
| initial viscosity, cps. | 710 | 320 | 422 | 736 |
| 48 hr. age viscosity, cps. | 994 | 502 | 470 | 680 |
| 96 hr. age viscosity, cps. | 1508 | 676 | 562 | 810 |

In order to establish that the present invention provided overall effectiveness, different evaluations were conducted which simulated water conditions found in cooling water systems where the concentration of, for example calcium ions and phosphate ions are such as to provide a calcium phosphate scale-prone system. Also performed were tests for calcium sulfate, calcium carbonate and iron oxide inhibition.

Table 6 shows the results at various time intervals of calcium sulfate, calcium phosphate, calcium carbonate and iron oxide inhibition using differing amounts of CHPBMA and acrylic acid (AA).

In Table 6, NTU represents nephelo trubidity units.

TABLE 6

ACRYLIC ACID/CHPBPMA

| SAMPLE | % AA | % CHPBPMA | Mw/Mn = D | $CaSO_4$ ppm Polymer 1.0 | $CaSO_4$ 2.5 | $CaSO_4$ 5.0 | $CaCO_3$ ppm 5.0 | $CaCO_3$ Polymer 10.0 | $Ca_3(PO_4)_2$ ppm 5.0 | $Ca_3(PO_4)_2$ Polymer 10.0 | $Fe_2O_3$ NTU 1.0 | $Fe_2O_3$ 5.0 | Dry $Fe_2O_3$ NTU 1.0 | Dry $Fe_2O_3$ 5.0 Ca | % P |
|---|---|---|---|---|---|---|---|---|---|---|---|---|---|---|---|
| 1. | 100 | 0 | $2.4 \times 10^4$/$3.0 \times 10^3$ 8.0 | 100 | 100 | 100 | | | 7.8 | 30.1 | | | 35 | 20 | 0 |
| 2. | 90 | 10 | $2.36 \times 10^4$/$3.10 \times 10^3$ | | | | 100 | 24.6 | 45.2 | | | | | | 2.92 |
| 3. | 80 | 20 | $2.45 \times 10^4$/$2.73 \times 10^3$ 8.83 | | | | 100 | 23.6 | 33.4 | 5.7 | 14.5 | | | 80 | 25 | 5.29 |
| 4. | 100 | 0 | $6.0 \times 10^3$/$1.65 \times 10^3$ | | | | | | 52.9 | 36.4 | 390 | 350 | 130 | 55 | 0 |
| 5. | 90 | 10 | $6.18 \times 10^3$/$1.53 \times 10_3$ 4.04 | | | | 100 | 43.2 | 58.4 | | | | | | 4.36 |
| 6. | 80 | 20 | $5.73 \times 10^3$/$1.69 \times 10^3$ 3.39 | | | | 100 | 39.3 | 55.1 | 5.2 | 12.0 | 390 | 350 | 130 | 40 | 5.22 |
| 7. | 100 | 0 | $4.4 \times 10^3$/$1.6 \times 10^3$ | | | | | 28.3 | 49.7 | | | 380 | 360 | | | 0 |
| 8. | 90 | 10 | $4.43 \times 10^3$/$1.68 \times 10^3$ 2.64 | | | | | 36.2 | 60.1 | 54.2 | 71.6 | 435 | 420 | | | 0 |
| 9. | 80 | 20 | $4.40 \times 10^3$/$1.63 \times 10^3$ 2.72 | | | | | 38.5 | 51.7 | 22.2 | 56.0 | | | | | 0 |
| 10. | 0 | 100 | | | | | | 13.4 | 17.5 | 14.0 | 69.9 | | | | | 0 |

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

What is claimed is:

1. An aminophosphonate-containing polymer having the formula:

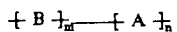

wherein
A represents repeating units from an ethylenically unsaturated comonomer(s),
B is

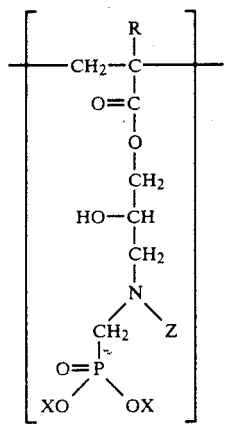

wherein
R is hydrogen or methyl,
X is hydrogen or an alkali metal,
Z is $CH_2-P(O)(OX)_2$ or $C_1-C_6$ alkyl, aryl, cyclohexyl or alkaryl,
m and n are positive integers,
m/n=0.01 to 0.5.

2. The polymer according to claim 1, which is water soluble or water dispersible.

3. The polymer according to claim 1, wherein Z is $CH_2-P(O)(OX)_2$.

4. The polymer according to claim 1, wherein m/n is 0.01 to 0.25.

5. Thy polymer according to claim 1 wherein the ethylenically unsaturated comonomer is selected from the group consisting of acrylic acid and methacrylic acid and an ester thereof with $C_1-C_{18}$ alcohol; (meth)acrylamide and its N-substituted methyl, ethyl, propyl and butyl derivative; N-mono or diphenylacrylamide; vinyl acetate and vinyl propionate; butyl vinyl ether; N-vinyl pyrrolidinone; styrene and ethylene; methyl and ethyl vinyl ketone; dimethyl, diethyl, dipropyl, dibutyl, diphenyl, dibenzyl and diphenylethyl ester of itaconic acid, maleic acid and fumaric acid and polyethylene or polypropylene acrylate and methacrylate.

6. The polymer according to claim 5, wherein the comonomer is acrylic acid methacrylic acid, vinyl acetate or N-vinyl pyrrolidinone.

7. The polymer according to claim 6, wherein the comonomer is acrylic acid.

* * * * *